April 5, 1966  T. R. SMITH-MILLER  3,244,036
APPARATUS FOR APPLYING TRACTION CHAINS TO VEHICLE TIRES
Filed May 7, 1964  13 Sheets-Sheet 1

April 5, 1966 T. R. SMITH-MILLER 3,244,036
APPARATUS FOR APPLYING TRACTION CHAINS TO VEHICLE TIRES
Filed May 7, 1964 13 Sheets-Sheet 4

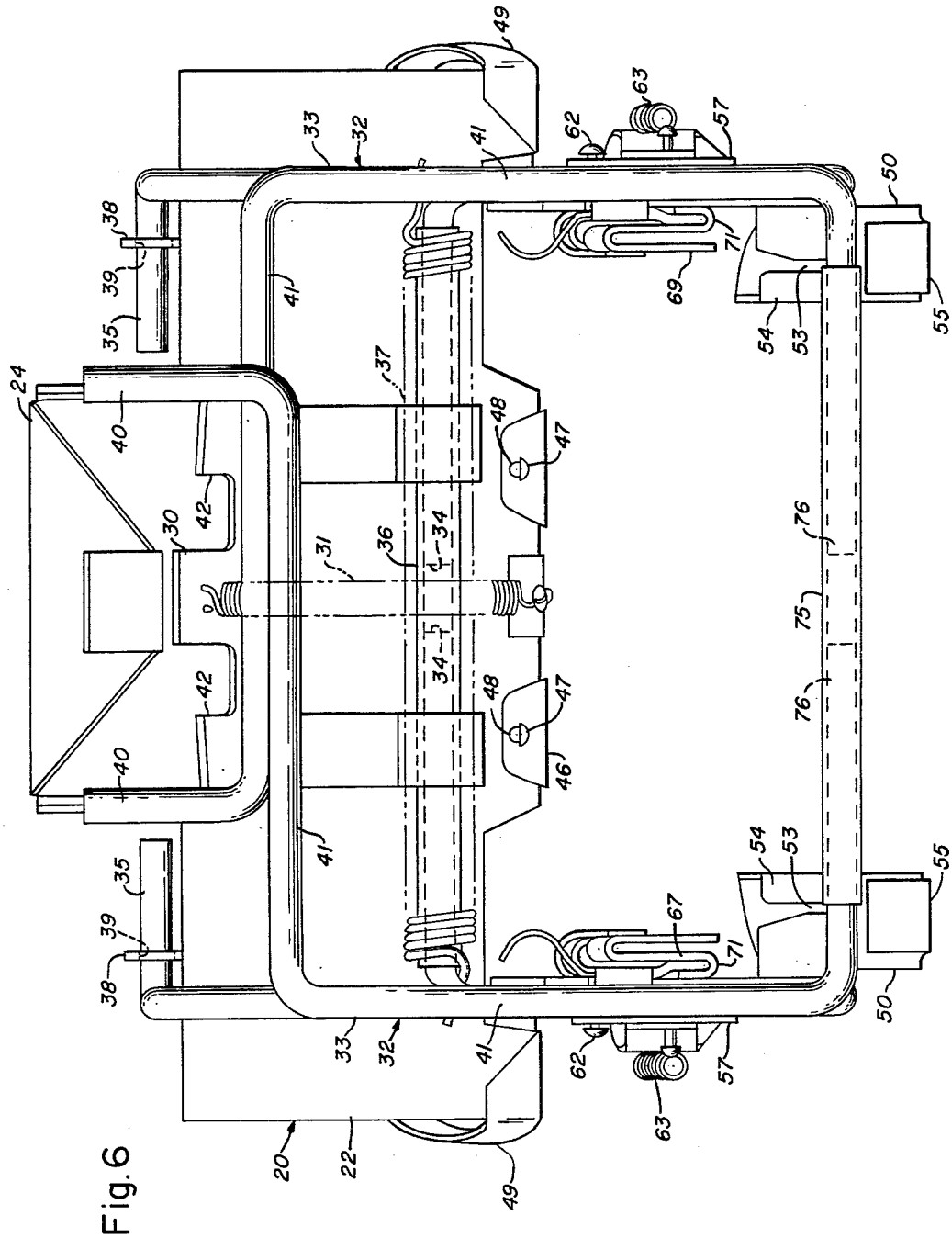

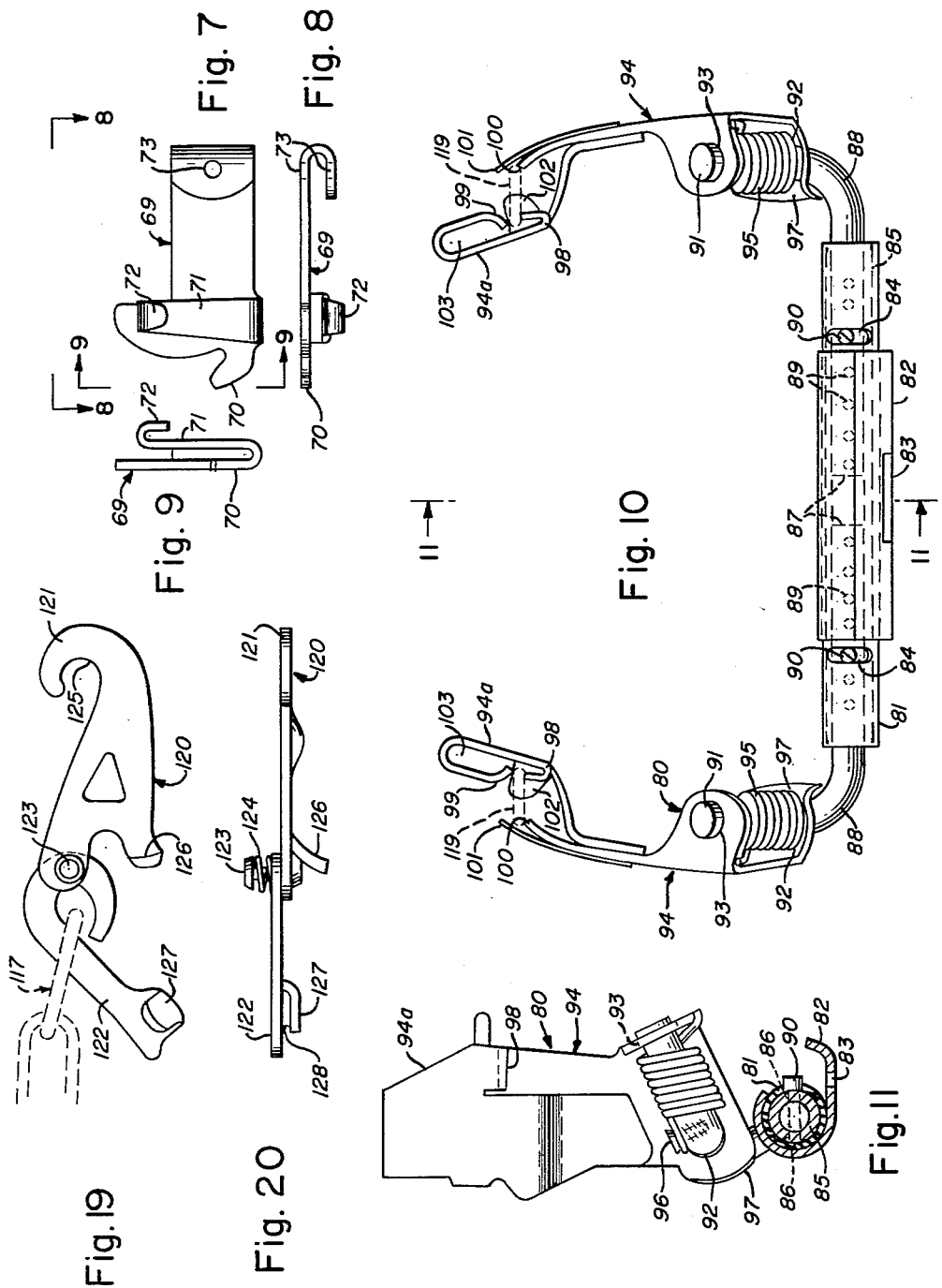

April 5, 1966  T. R. SMITH-MILLER  3,244,036
APPARATUS FOR APPLYING TRACTION CHAINS TO VEHICLE TIRES
Filed May 7, 1964  13 Sheets-Sheet 9

April 5, 1966     T. R. SMITH-MILLER     3,244,036
APPARATUS FOR APPLYING TRACTION CHAINS TO VEHICLE TIRES
Filed May 7, 1964     13 Sheets-Sheet 10

United States Patent Office 3,244,036
Patented Apr. 5, 1966

3,244,036
APPARATUS FOR APPLYING TRACTION
CHAINS TO VEHICLE TIRES
Theodore R. Smith-Miller, R.F.D. 1, Mount Kisco, N.Y.
Filed May 7, 1964, Ser. No. 365,579
17 Claims. (Cl. 81—15.8)

This invention relates to traction chains for vehicle wheels and, more particularly, to improved apparatus for readily applying a traction chain to a tire of an automobile or other vehicle in a simple and expeditious manner.

There has been developed apparatus for applying a traction chain to a vehicle wheel tire which is extremely rapid in action and highly efficient. Representative apparatus of this type are disclosed, for example, in copending U.S. application Serial No. 121,071, filed June 30, 1961, by Theodore R. Smith-Miller, now Patent 3,136,118, and in Smith-Miller U.S. Patent 2,990,737, granted July 4, 1961. Such apparatus customarily includes a tire clamp unit which holds the end links at one end of the traction chain and is arranged to rotate with the tire of the vehicle. The latching mechanisms at the opposite end of the chain are maintained in predetermined positions relative to the vehicle by a chain carrier unit which is connected to the bumper or other part of the vehicle by an adjustable support unit removably affixed thereto. As the clamp unit is carried around by the rotating tire, the chain is mounted on the tire and is automatically latched in place. Thereafter, the clamp, carrier and support units are disconnected and are returned to the trunk or other suitable storage compartment of the vehicle.

Heretofore, in the use of apparatus of the foregoing type, an accidental jarring of the vehicle or the attached carrier unit, variations in road conditions, etc., occasionally produced changes in the relative positions of the latching mechanism supported by the carrier unit and the axis of the tire, and this relative movement sometimes resulted in a misalignment between the latching mechanisms and the end links which impaired the automatic latching of the chain. In addition, and this has been of special moment in cases in which one or more assembled chains and carrier units were stored in the trunk or other compartment of the vehicle prior to use, difficulties often were encountered heretofore in fixedly securing the latching mechanisms in their proper positions on the carrier unit. Moreover, the support unit of such prior apparatus has exhibited various deficiencies which further detracted from the numerous advantages of the apparatus in the automatic application of a traction chain to a vehicle tire.

One general object of this invention, therefore, is to provide new and improved apparatus for applying a traction chain to the tire of a vehicle.

More specifically, it is an object of the invention to provide such apparatus in which the possibility of changes in the relative positions of the latching mechanisms of the chain and the axis of the tire is substantially eliminated.

Another object of the invention is to provide apparatus of the character indicated in which the latching mechanisms are firmly retained in preselected positions until the end links of the chain are brought into position for locking engagement therewith, regardless of snow, ice, mud, or other road conditions.

A further object of the invention is to provide apparatus for applying a traction chain to a vehicle wheel tire which includes a unique support member for facilitating the positioning of the apparatus with respect to the vehicle.

A still further object of the invention is to provide chain applying apparatus utilizing comparatively simple mechanical elements, which apparatus is of reduced size and weight and is thoroughly reliable in operation.

In one illustrative embodiment of this invention, there is provided apparatus for applying a traction chain to a vehicle wheel tire which includes a tire clamp unit for releasably retaining the end links of the chain and a chain carrier unit for similarly retaining the latching mechanisms of the chain. The carrier unit comprises a chassis assembly for supporting the major portion of the chain and an arm assembly for holding the chain latching mechanisms. The arm assembly is connected to the chassis assembly and includes a pair of spaced arms interconnected by a cross bar which contacts the tread of the tire. The chassis assembly is affixed to the vehicle by a unique support member, while the clamp unit engages the side walls of the tire. Upon movement of the vehicle in a rearward direction to rotate the tire, the clamp unit carries the end links of the chain around the tire periphery and into juxtaposition with the latching mechanisms on the carrier unit. The latching mechanisms are thereupon automatically locked to complete the chain applying operation.

The chain carrier unit and the tire clamp unit have their parts so constructed and arranged as to enable them to be easily and quickly locked by hand to the support member in proper initial relative positions with respect to the tire. The support member, connected to an automobile mud guard or other fixed part of the vehicle, firmly maintains the chassis assembly of the carrier unit in place at all times during use. The chain latching mechanisms are held by the arm assembly of the carrier unit, and the arm assembly is connected to the chassis assembly in a manner such that the latching mechanisms are maintained in preselected positions relative to the axis of the tire for subsequent engagement with the end links.

In accordance with one feature of the invention, in certain advantageous embodiments, the movement of the clamp unit relative to the carrier unit is retarded as the tire completes its turn to predetermine the stop position of the end links of the chain relative to the latching mechanisms. With this arrangement, the locking of the latching mechanisms to the end links is substantially independent of the length of the chain.

In accordance with another feature of the invention, in certain good arrangements, the arm and chassis assemblies of the carrier unit are interconnected by unique biasing means which permits relative motion therebetween. This biasing means resiliently urges the cross bar of the arm assembly into contact with the tire to hold the latching mechanisms in place irrespective of any changes in the relative positions of the tire and the carrier unit.

In accordance with still another feature of the invention, in some embodiments, the arm assembly is provided with a pair of receptacles which rigidly maintain the chain latching mechanisms in position until the side chains begin to exert force on the latching mechanisms in a predetermined direction. The receptacles are arranged for limited movement with respect to the arm assembly only in this direction and are resiliently restrained from such movement to affirmatively prevent the premature release of the latching mechanisms.

In accordance with a further feature of certain embodiments of the invention, the support member remains permanently affixed to the vehicle at all times and is arranged in a predetermined location to enable the rapid and accurate mounting of the carrier unit in its chain applying position.

In one convenient way of using the apparatus to apply, say, a pair of traction chains to the rear tires of an automobile, a support member is permanently affixed to the automobile on the forward side of each of the tires. The automobile is equipped with two chain carrier units and two tire clamp units which are stored in the trunk or other suitable compartment, and a traction chain is mounted on each carrier unit and its corresponding clamp unit, ready for use.

When a need for the chains arises, the assembled carrier units, clamp units and chains are removed from the trunk, and the carrier units are manually connected to the support members. The chains are applied to the rear tires and automatically latched in place by driving the automobile in a reverse direction for a few feet. The carrier and clamp units are then disconnected from their support members and are returned to the trunk.

The present invention, as well as further objects and features thereof, will be understood more clearly and fully from the following description of a preferred embodiment, when read in conjunction with the accompanying drawings, in which:

FIGURE 6 is a bottom view of the carrier unit;

FIGURE 7 is a side elevational view of a latch member that forms a part of the carrier unit;

FIGURE 8 is an edge elevational view of the latch member as seen from the line 8—8 in FIGURE 7;

FIGURE 9 is an edge elevational view of the latch member as seen from the line 9—9 in FIGURE 7;

FIGURE 10 is a front elevational view of the clamp unit of the apparatus, with portions of the chain shown in dotted lines;

FIGURE 11 is a vertical sectional view of the clamp unit taken along the line 11—11 in FIGURE 10;

FIGURE 19 is a plan view of the latching mechanism in an open position and connected to an end of the chain; and FIGURE 20 is a top view of the latching mechanism shown in FIGURE 18.

Figure 1:
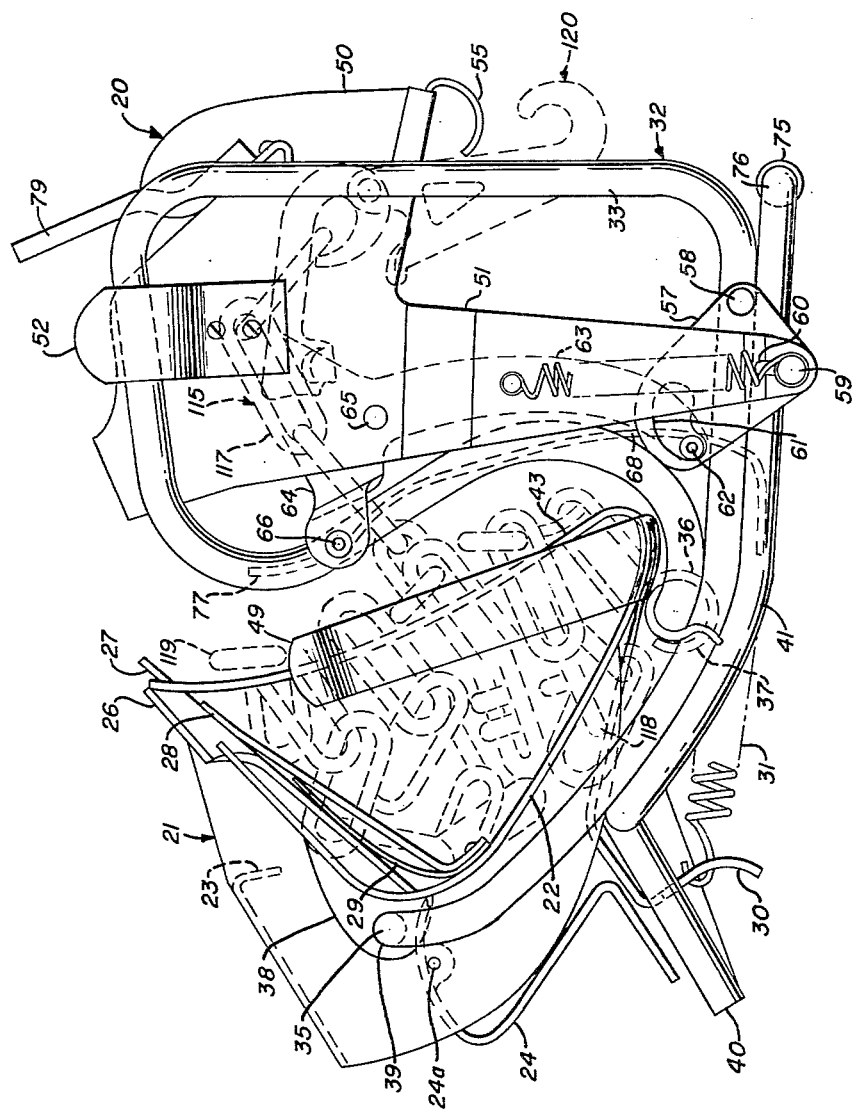
FIGURE 1 is a side elevational view of the carrier unit of apparatus for applying a traction chain to a vehicle wheel tire in accordance with an illustrative embodiment of the invention, together with portions of the chain shown in dotted lines.

Referring initially to FIGURES 1 through 6 there is shown a chain carrier unit which is indicated generally by the reference numeral 20. The carrier unit 20 includes a chassis assembly 21 fabricated from one or more pieces of sheet metal which are cut, bent and joined together. One portion of the chassis assembly comprises a base plate 22 of generally C-shaped cross-section, while another portion is mounted externally on the forward side of the plate 22 (the left side, as viewed in FIGURE 1) to provide a depending cross piece 23 in fixed relationship with the plate. This latter portion supports a Z-shaped locking lever 24 beneath the cross piece 23 which is pivotally carried adjacent its upper leg by a pin 24a.

Figure 2:
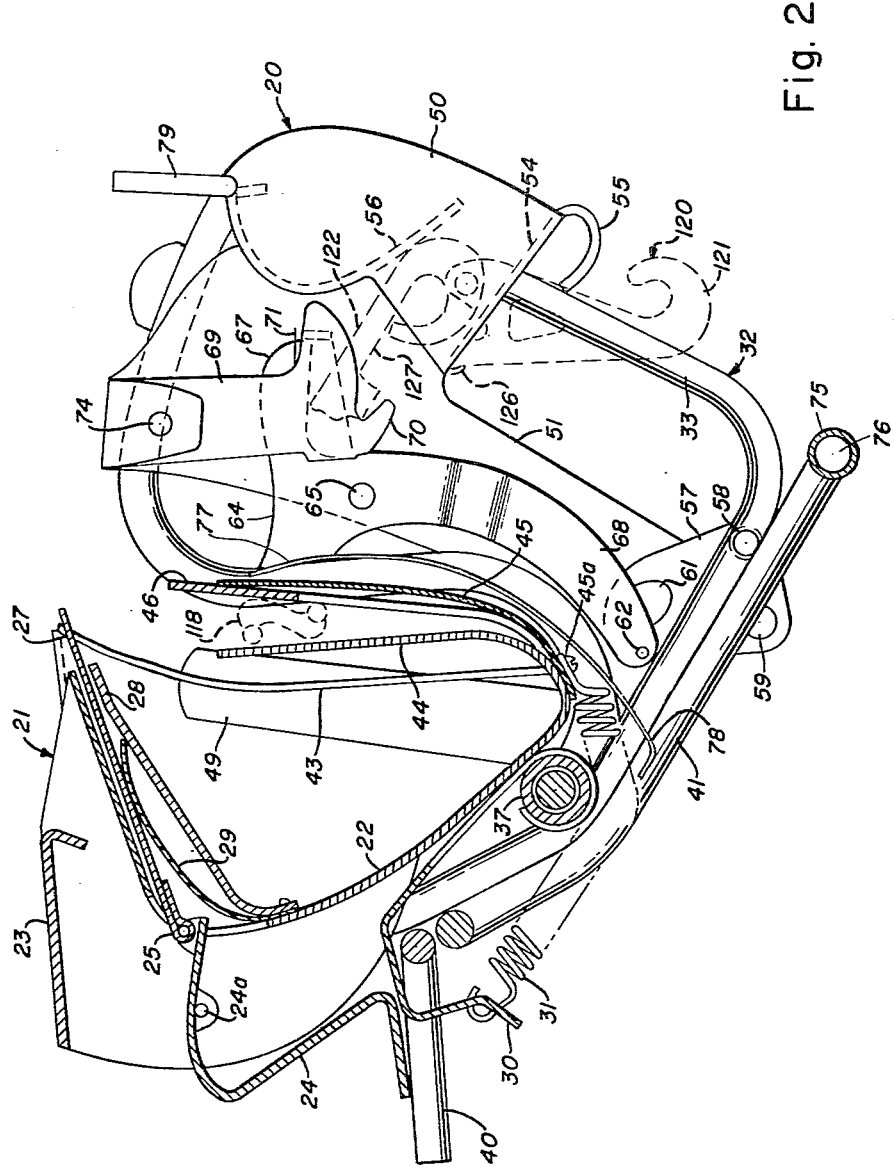
FIGURE 2 is a vertical sectional view of the carrier unit, with portions of the chain shown in dotted lines.
Figure 5:
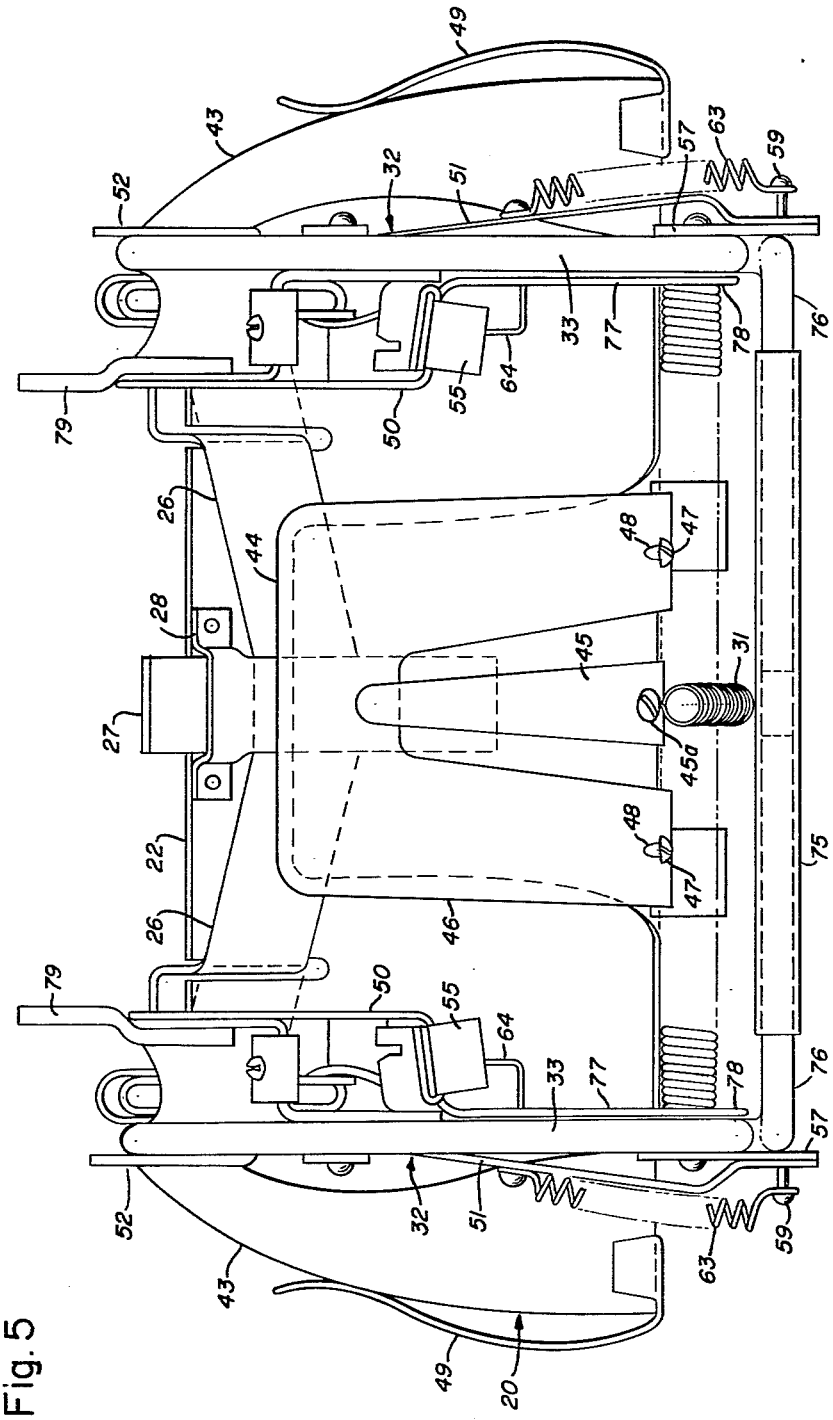
FIGURE 5 is a rear elevational view of the carrier unit.

As best shown in FIGURES 2 and 5, the upper leg of the locking lever 24 is connected by a hinged joint 25 to an elongated tongue 27. The tongue 27 protrudes through a mating aperture in the plate 22 and is arranged for longitudinal sliding movement with respect thereto through a guide piece 28. A pair of laterally extending arms 26 are fixedly secured to the tongue 27 intermediate its ends and are movable therewith in response to pivotal movement of the lever 24 about the pin 24a. The tongue and arm assembly is engaged by a flat spring 29 which is secured to the plate 22 and bears against the assembly to cause the arms 26 and the tongue 27 to remain either in their fully up (FIGURE 2) position or in their fully down (FIGURE 15) position.

Immediately beneath the locking lever 24 is a pivoted catch 30 which forms a portion of the arm assembly 32 of the carrier unit 20. The catch 30 protrudes from the forward part of the arm assembly 32, and its protruding end is connected to one end of a rearwardly extending coil spring 31, the other end of which is fixedly secured to the chassis assembly 21 adjacent the plate 22. The arm assembly 32 comprises a pair of spaced arms or rods 33 which are bent in the manner best shown in FIGURES 1 and 6. Each of the arms 33 includes an end portion 34 (FIGURE 6), and these end portions extend transversely in spaced-apart coaxial relationship with each other. The portions 34 are slidable within a transverse guide tube 36 between the arms which is located inside a coil spring 37. The spring 37 is anchored at its ends to the respective arms and is prestressed in tension to resiliently bias the arms toward each other to the extent permitted by a pair of spaced-apart brackets 38 fixedly secured to the base plate 22. Each of the brackets 38 is provided with an opening 39 through which the opposite end portion 35 of the corresponding arm 33 extends to permit sliding movement of the arms toward and away from each other.

The center portion of the transverse coil spring 37 rests on the longitudinally extending coil spring 31 intermediate the ends of this latter spring. The end of the catch 30 opposite that connected to the spring 31 extends in a rearward direction above the spring 31 and is bifurcated, as best shown in FIGURE 6, to accommodate the spring 37 on either side of the spring 31. The bifurcated end of the catch 30 extends around the spring 37 to permit pivotal movement of the catch about the axis of the spring.

The arrangement of the catch 30 and the coil spring 31 permits resiliently biased rocking movement of the arm assembly 32 with respect to the chassis assembly 21 about the transversely extending arm end portions 35. The tension in the spring 31 biases the arm assembly in a counterclockwise direction, as viewed in FIGURES 1 and 2, about the portions 35 to thereby urge the rearwardly directed part of the arm assembly (the right-hand part, as viewed in these figures) in a generally upward and rearward direction with respect to the chassis assembly, for purposes that will become more fully apparent hereinafter. The upward and rearward movement of the arm assembly relative to the chassis assembly is limited by the engagement of the portion of the catch 30 around the spring 37 with the lower surface of the plate 22.

The arms 33 are movable toward and away from each other in response to movement of a pair of handles 40. The handles 40 are formed at the forward ends of two bent rods 41 which are welded or otherwise fixedly secured to the arms 32. As best shown in FIGURE 6, the rods 41 include transversely extending intermediate portions which cross each other adjacent the handles 40 such that, upon movement of the handles toward each other, the arms 33 are urged apart against the action of the spring 37.

The pivoted catch 30 is provided with a pair of transversely spaced indentations 42. These indentations are arranged to accommodate the handles 40 and thereby hold the arms 33 in an expanded position against the spring 37. As best shown in FIGURE 2, the intermediate portion of the catch 30 passes over the transversely extending portions of the rods 41 and is biased into contact therewith by the coil spring 31. As indicated heretofore, the spring 31 urges the catch in a counterclockwise direction, as viewed in this figure, about the coil spring 37, and the intermediate catch portion is thereby biased downwardly to hold the handles 40 within the indentations 42. Upon the lifting of the catch against the tension in the spring 31, the indentations 42 are carried out of registry with the handles 40 to release the handles and permit the arms 33 to return to their unexpanded position under the action of the spring 37.

Figure 3:
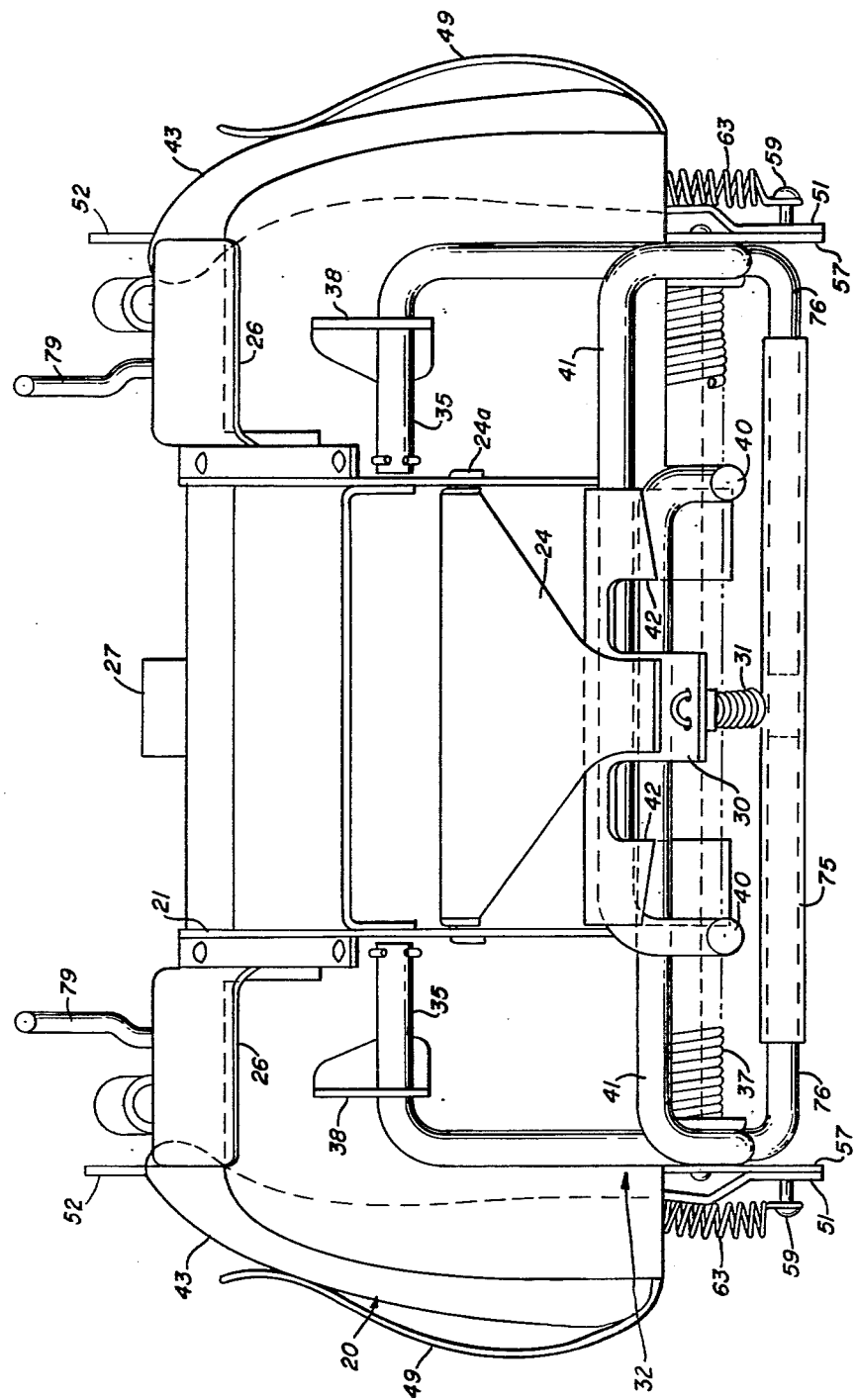
FIGURE 3 is a front elevational view of the carrier unit.
Figure 4:
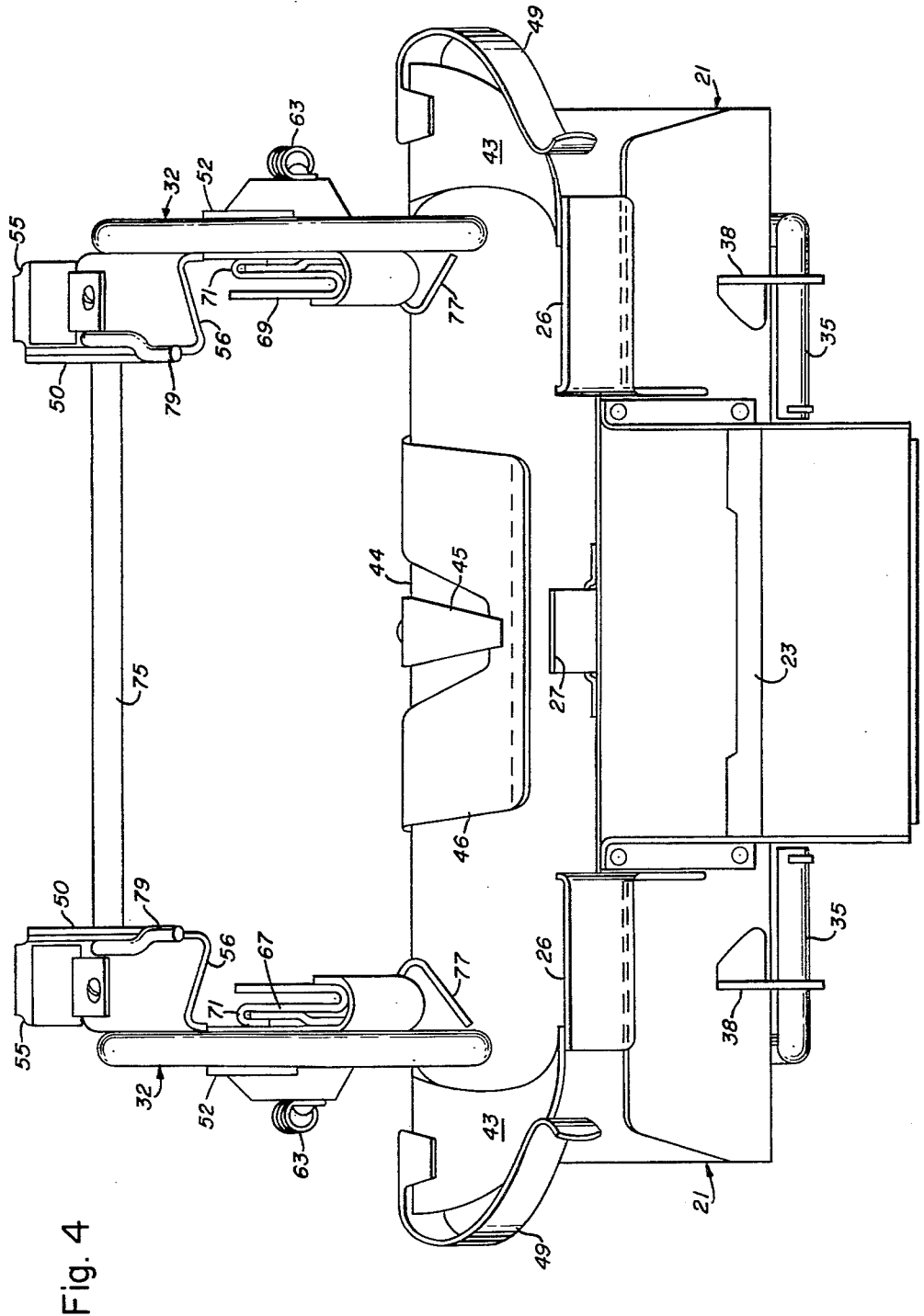
FIGURE 4 is a top plan view of the carrier unit.

A pair of spaced blades 43 (FIGURES 2, 4 and 5) are fixedly secured to the base plate 22 of the chassis assembly 21. The blades 43 extend upwardly from the plate 22 to positions adjacent the outer ends of the movable arms 26 such that, with the arms in their fully up position (the position shown in FIGURE 4), the blades contact the arms. Intermediate the blades 43 is a shield 44 which is affixed to the central portion of the plate 22 and similarly extends in an upward direction. The rearwardly directed surface of this shield is provided with a leaf spring 45 and an inverted U-shaped plate 46. The legs of the plate 46 are secured to the lower portion of the shield by two connectors 47 (FIGURE 5) which are arranged to pass through over-sized holes 48 in the legs, thereby permitting limited movement of the plate 46 with respect to the shield. The leaf spring 45 is connected to the lower portion of the shield by a screw 45a which also serves to hold the adjacent end of the coil spring 31 in fixed relationship therewith. The upper end of the spring 45 engages the intermediate portion of the plate 46 to urge the plate up against the adjacent face of the shield 44. The arrangement is such that the plate 46 is pivotally movable about the connectors 47 in a generally clockwise direction, as viewed in FIGURE 2, against the tension in the spring 45 to resiliently hold the first cross links 118 of the traction chain between the shield and the plate. The major portion of the chain is arranged between the blades 43 and the plate 22 with the side chains extending around the blades. As best seen in FIGURE 3, the outer portion of each of the blades 43 is provided with an upstanding stop or clamp member 49 in resilient engagement therewith. The member 49 serves to releasably hold the corresponding side chain in place around the blade.

Each side frame or arm 33 (FIGURE 1) of the carrier unit 20 also comprises an assembly of devices that are adapted to carry the latching mechanisms of the chain and to coact with other parts to operate and then release the mechanisms when the chain is applied to the tire. Each of these assemblies includes a receptacle 50 which is movably supported adjacent the upper rearward portion of the corresponding arm 33. The receptacle 50 is provided with an outer wall 51 which extends downwardly therefrom to a position adjacent the lowermost portion of the corresponding rod 41. A clamp 52 is fixedly secured to the wall 51 adjacent its upper portion, and this clamp extends loosely around the adjacent arm 33 to permit vertical reciprocable movement of the receptacle 50 relative to the arm assembly 32.

The lower wall 54 (FIGURE 6) of each of the receptacles 50 is provided with a slot 53 which is arranged to releasably retain the corresponding latching mechanism of the chain. As best shown in FIGURE 2, a rearwardly directed extension of the wall 54 is bent to form a bumper 55 which is located beneath the slot 53 at the extreme rearward portion of the chain carrier unit. Each receptacle 50 additionally includes a curved forward wall 56, the lower end of which is spaced a short distance above the wall 54.

The vertical reciprocable movement of each of the receptacles 50 relative to its arm 33 is controlled by a linkage mechanism which includes a first lever 57 and a second lever 64 (FIGURES 1 and 2). The lever 57 is in the form of a flat upstanding plate adjacent the lower portion of the arm assembly 32 which is pivotally connected to the corresponding arm 33 by a pin 58 at a rearwardly directed corner of the lever. An adjacent corner of the lever 57 is pivotally and slidably connected to the lower end of the receptacle wall 51 by a pin 59. This latter pin is affixed to the lever 57 and extends through a generally vertical slot 60 in the wall 51. One end of a coil spring 63 is connected to the pin 59, and the spring 63 extends upwardly from the pin with its upper end secured to the intermediate portion of the wall 51.

The second lever 64 of the linkage mechanism for each receptacle 50 is pivotally connected to the receptacle wall 51 at 65 and is also pivotally connected to the adjacent portion of the corresponding arm 33 at 66. The lever 64 includes a rearwardly protruding extension 67 (FIGURE 2) and a somewhat longer extension 68 of generally arcuate configuration. The extension 68 extends downwardly from the connection 65, and its lower end is provided with a flat-headed connector 62. This connector protrudes through a generally kidney-shaped hole 61 in the upper forward portion of the lever 57.

The arrangement is such that the linkage mechanism for each of the receptacles 50 permits limited movement of the receptacle relative to the corresponding arm 33 in a substantially vertical direction but prevents movement of the receptacle in any other direction. The coil spring 63 resiliently interconnects the linkage mechanism levers 57 and 68 with the receptacle wall 51 to bias the receptacle in a preselected lower or locked position (the position shown in FIGURES 1 and 2). In this position, the spring 63 tends to urge the wall 51 downwardly with respect to the pin 59 on the lever 57, and the connector 62 is forced against the lower, forward portion of the kidney-shaped hole 61. The pin 59 initially is maintained in the center portion of the slot 60. As the receptacle 50 moves upwardly from its locked (FIGURES 1 and 2) position to its released (FIGURES 17 and 18) position, in a manner to be described hereinafter, the lever 64 pivots in a counterclockwise direction about the pin 66 to urge the connector 62 against the hump formed by the kidney-shaped hole 61, thereby momentarily moving the lever 57 counterclockwise about the pin 58 and carrying the pin 59 to the lower portion of the slot 60. Upon continued upward movement of the receptacle, the connector 62 moves to the rear and then to the forward portion of the hole 61, while the pin 59 confined in slot 60 impels the lever 57 to follow the movement of the receptacle, thus pivoting the lever 57 in a clockwise direction about the pin 58. The lever 64 comes to a stop when the lever 57 reaches the position shown in FIGURE 17, thereby arresting the movement of the receptacle 50. At the time the receptacle reaches its uppermost position, the pin 59 is located in the top portion of the slot 60.

A latch member 69 of generally boot-shaped configuration is positioned adjacent the inner surface of each of the lever extensions 67 and is adapted to operate the corresponding latching mechanism of the chain. As best shown in FIGURES 7-9, the heel of each latch member 69 forms a finger 70. The latch member additionally includes a bent extension 71 adjacent the finger 70 which extends in a plane parallel to that of the latch and includes a turned down tip 72 at its free end. The end of the latch opposite that including the finger 70 likewise is bent and is provided with an opening 73 which accommodates a pin 74 (FIGURE 2). This pin serves to pivotally connect the latch to a bent over upper portion of the receptacle wall 51 with the latch in a position such that its extension 71 is engageable with the adjacent extension 67.

The extreme rearward portions 76 (FIGURES 1 and 6) of the rods 41 are bent inwardly in transverse coaxial relationship with each other and are provided with a hollow cross bar 75. The cross bar 75 extends between the arms 33 and forms a part of the arm assembly 32. The cross bar is freely rotatable on the portions 76 and is arranged to be resiliently urged against the tread of the tire by the action of the coil spring 31.

The chain carrier unit 20 also is equipped with a pair of chain retaining springs 77 (FIGURES 2 and 5). Each of these springs is in the form of a vertically disposed wire which is fixedly secured at its lower end to the portion of the corresponding arm 33 immediately adjacent the coil spring 37, as shown at 78. The springs 77 serve to facilitate the releasable retention of the first cross links 118 of the chain in position on the chain carrier unit.

A pair of spaced parallel rods 79 are fixedly secured to the latching mechanism receptacles 50, and these rods extend upwardly to releasably hold the clamp unit 80 (FIGURES 10 and 11) of the apparatus in predetermined relationship with the carrier unit. The clamp unit 80 is of generally U-shaped configuration and includes a transversely extending tube 81 and two upstanding arms 94. A tongue member 82 is rigidly connected to the tube 81 adjacent its central portion and is provided with a transversely extending slot 83. A pair of additional slots 84 are spaced apart near the ends of the tube 81, and these latter slots extend at right angles to the tube axis on the side thereof adjacent the tongue slot 83. The tube 81 accommodates a second tube 85 which interconnects the arms 94 and is provided with two pairs of diametrically opposed holes 86 (FIGURE 11). These pairs of holes are spaced apart to coincide with the slots 84 in the tube 81.

Two side rods 88 are rotatably positioned in the respective ends of the tubular member 85. The inner end of each of these side rods includes a series of aligned apertures 89 spaced therealong to accommodate a wide range of tire sizes. One of these apertures in each rod accommodates a set screw 90 which extends through the corresponding hole 86 in the tube 85 and into the adjacent slot 84 in the tube 81. Because of the arrangement of the set screws 90 within the apertures 89, the holes 86 and the slots 84, the side rods are confined axially with respect to the tubes 81 and 85 but are arranged for limited rotational movement as a unit with respect to the tube 81 and the tongue member 82.

The ends 91 of the side rods 88 which protrude from the tube 85 are bent angularly in a generally upward direction, and each of the protruding ends passes through two apertures 92 and 93 in the lower portions of the clamping arms 94. A torsion spring 95 is disposed around each rod end between the apertures 92 and 93. The spring 95 is fastened at one end to the rod by a set screw 96 (FIGURE 11), and its other end engages the adjacent portion of the corresponding arm 94 to resiliently bias the arms toward each other. The extent of movement of the arms in this direction is limited by two lips 97 which extend from the lower portions of the respective arms and bear against the associated rods 88.

With this arrangement, the clamping arms 94 are manually movable away from each other against the restraining action of the springs 95. The clamp unit may be adjusted for tires which vary widely in size by removing the set screws 90 from the apertures 89 and pulling the arms 94 apart to the desired position. The set screws are then inserted through the particular apertures 89 thereadjacent.

The clamping arms 94 extend upwardly from the rods 88 and are formed from sheet metal pieces shaped to define receptacles which receive and releasably hold the end links 119 of the side chains. Each arm 94 is provided with an extension 94a which is bent inwardly in spaced relationship with the remaining portion 100 of the arm. The extension 94a includes a first flange 98 which is bent in an upward direction and a second flange 99 which is bent downwardly in spaced relationship with the flange 98. The flanges 99 form elongated, generally tubular cavities 103 which are arranged to accommodate the parallel rods 79 (FIGURE 5) of the carrier unit when the clamp unit is positioned thereon. The portion 100 of the arm 94 includes an upstanding leaf spring 101. The end link 119 of the corresponding side chain is releasably held in a generally horizontal plane by the flanges 98 and 99 of the arm portion 94a, the top edge of the portion 100 and the leaf spring 101. A rear stop 102 prevents movement of the link 119 against the pull of the following links.

Figure 13:
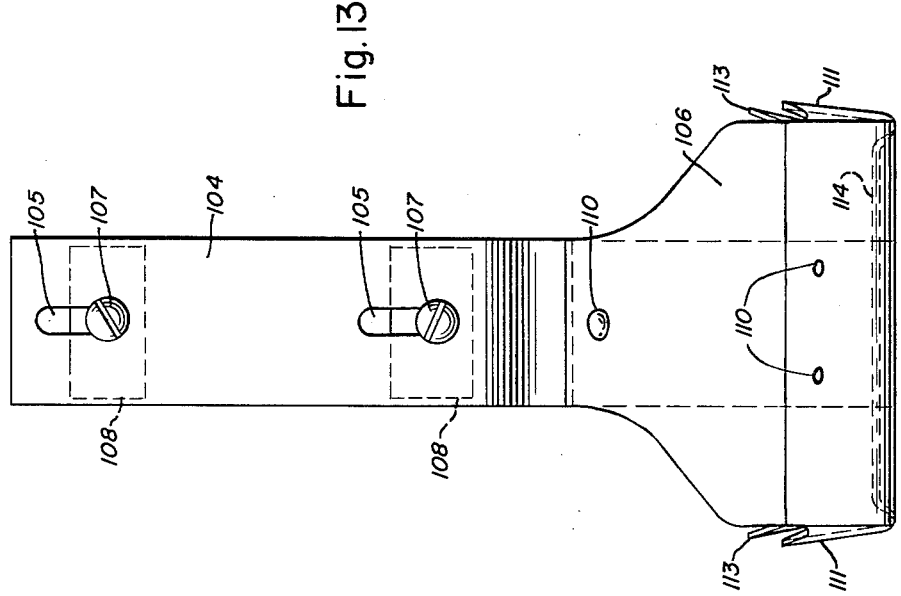
FIGURE 13 is a front elevational view of the support member.
Figure 12:
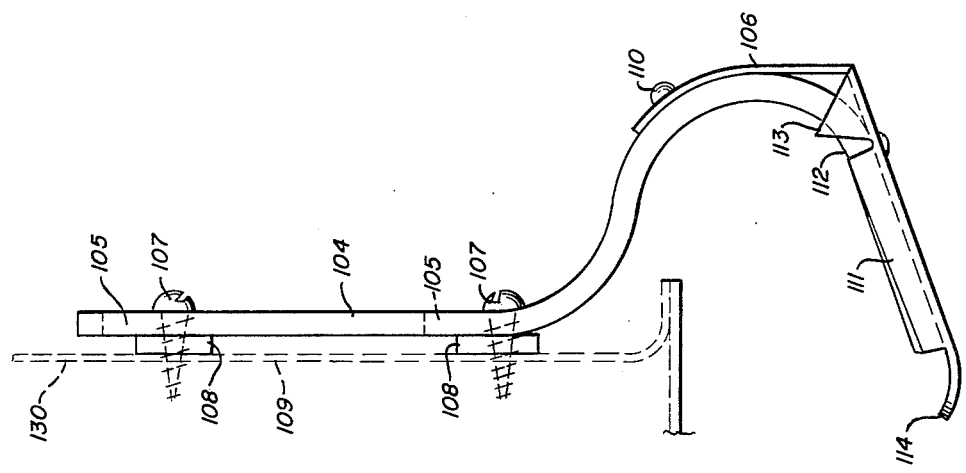
FIGURE 12 is a side elevational view of the support member of the apparatus, together with a schematic representation of cooperating parts of the vehicle.

The apparatus additionally includes a support unit 104 which is best shown in FIGURES 12 and 13. The upper portion of the support unit 104 is in the form of a substantially flat vertically extending plate which is provided with a pair of slotted holes 105. The lower portion of the unit 104 is bent in a forward direction and extends at a slight angle with respect to the horizontal. A plate 106 is secured to the lower surface of the bent portion by rivets 110. The plate 106 includes turned up edges 111 which are each provided with an indentation 112 and a pointed stop finger 113. The plate additionally includes a turned up portion 114 at its forward end.

The support unit 104 is fixedly secured to the vehicle by two bolts 107 which extend through mating apertures in a mud guard shown schematically at 130. As will be understood, the mud guard 130 forms the forward wall of the fender well for one of the rear tires of the vehicle. The bolts 107 pass through the elongated slots 105 in the unit 104 and permit the adjustment of the unit in a vertical direction to insure that it is properly oriented with respect to the axis of the tire. A pair of rectangular shims 108 are inserted between the unit 104 and the mud guard 109 to properly orient the unit in a horizontal direction.

As was stated earlier herein, the apparatus is adapted to apply a known type of full traction chain to a vehicle tire. Such a chain is generally denoted by numeral 115 and the tire by numeral 116 in several of the views. The traction chain comprises a pair of side chains 117 and a plurality of cross chains 118. Each side chain includes a terminal or end link 119 at one end and a latching mechanism 120 at its other end.

The latching mechanism is best shown in FIGURES 19 and 20 and comprises a hook member 121 and a keeper 122. These parts are pivotally connected by a pin 123 and are relatively movable along the axis of the pin. A helical compression spring 124 is interposed between the head of the pin and the keeper to yieldingly maintain the keeper against the hook member. The hook member defines a recess 125 which is adapted to receive a corresponding side chain end link 119 and is formed with a bent tongue 126. The keeper is connected to the end of its side chain 117 which is remote from end link 119 and is bent at 127 to define a recess 128 for reception of an edge portion of the hook member when the parts are in their locked (FIGURE 18) position.

The chain applying apparatus and the traction chain are assembled by interconnecting the carrier unit 20 and the clamp unit 80 and by placing various parts of the chain on these units in a manner that will now be described. The first step in this procedure is to expand the arms 33 of the carrier unit arm assembly 32. This is accomplished by moving the handles 40 toward each other from the positions shown in FIGURE 6 against the action of the coil spring 37 until the handles are brought to positions immediately beneath the indentations 42 in the catch 30. The coil spring 31 thereupon pivots the catch in a counterclockwise direction, as viewed in FIGURE 1, about the axis of the spring 37 to bring the indentations downwardly into registry with the handles 40, thus holding the handles closed and maintaining the arms 33 in their expanded positions.

Each of the chain latching mechanisms 120 is then mounted on the arm assembly 32 and is positioned in the receptacle 50 therefor with its parts and the parts of the receptacle in the relative position shown in FIGURE 2. In this position, the hook member 121 and the keeper 122 of the mechanism 120 are open and form a large acute angle therebetween. The hook member 121 registers with the receptacle slot 53 with the tongue 126 bearing against the lower wall 54. The bent portion 127 of the keeper 122 registers with the pivotally supported latch member 69 immediately above the finger 70. The latch member 69 is arranged in a substantially vertical position with its bent extension 71 in contact with the lateral extension 67 of the linkage mechanism lever 64. In addition, the receptacle 50 is held in its lowermost position and is resiliently locked in this position by the coil spring 63 (FIGURE 1).

The first cross chain 118 immediately adjacent the latching mechanisms 120 is then inserted between the shield 44 and the U-shaped plate 46. The central portion of this cross chain is held in place by the action of the leaf spring 45, while its outer portions are releasably retained by the springs 77. The remaining cross chains are successively placed between the blades 43 and the base plate 22 with the side chains extending around the blades. The end links 119 (FIGURE 10) are then releasably installed on the side arms 94 of the clamp unit 80 in the manner described heretofore.

Figure 14:
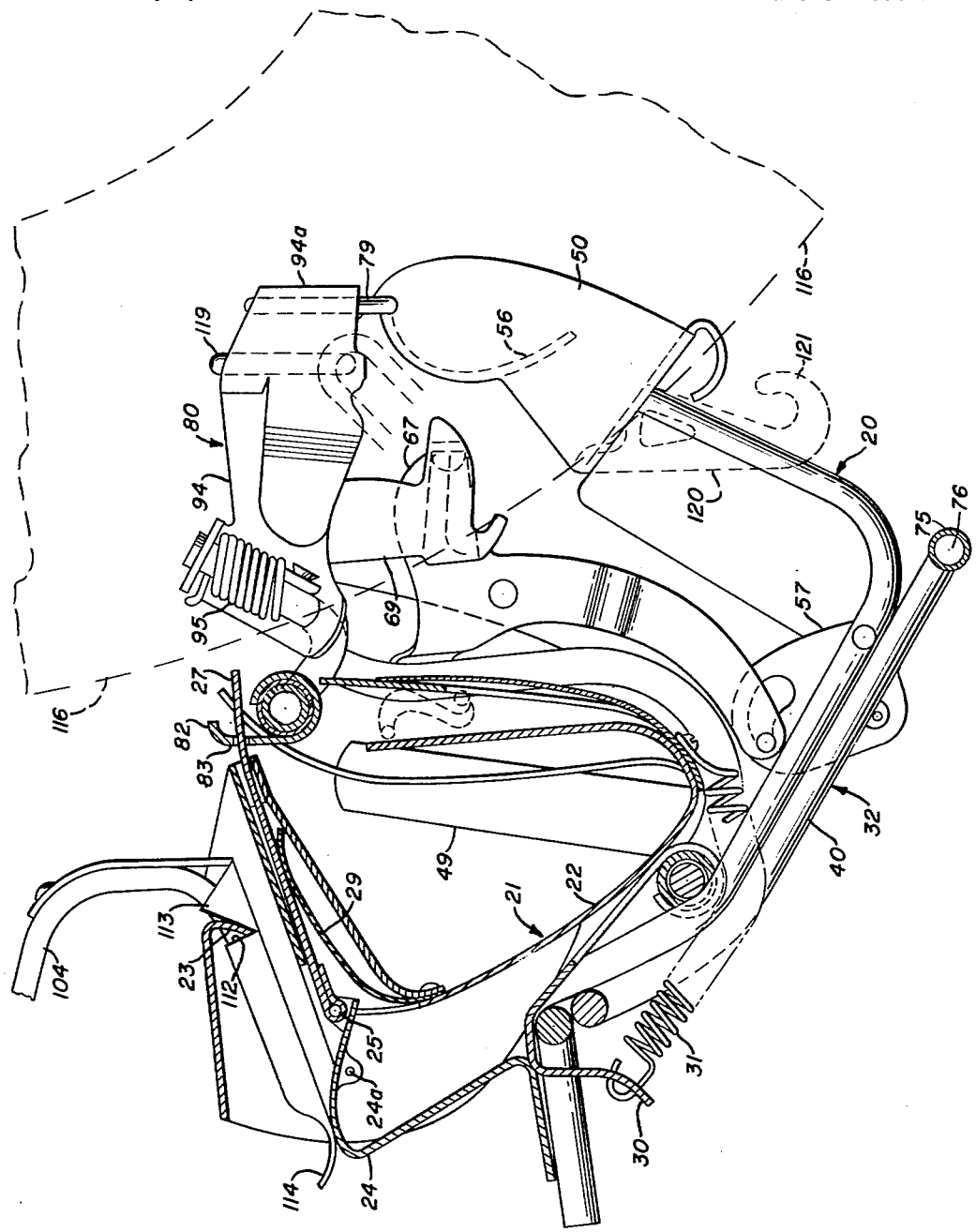
FIGURE 14 is a vertical sectional view of the assembled carrier unit, clamp unit and portions of the traction chain showing the manner of positioning the assembly on the support member in juxtaposition with a tire.

With the end links 119 in place on the clamp unit 80, the clamping arms 94 are manually pulled apart against the action of the springs 95 until the cavities 103 are spaced a sufficient distance to accommodate the rods 79 of the carrier unit 20. The clamp unit is inserted on the carrier unit with the slot 83 in registry with the upstanding tongue 27 of the carrier unit, as best shown in FIGURE 14. Upon the release of the arms 94, the force exerted by the springs 95 causes the arm portions 94a to grip the rods 79 and effect frictional holding engagement between the carrier and clamp units.

To install the traction chain on the tire 116, the assembly comprising the carrier unit, the clamp unit and the chain is positioned adjacent the forward side of the tire on the support unit 104. The cross piece 23 of the carrier unit is located above the plate 106 of the support unit with the cross piece held in position by the indentations 112 and the pointed stop fingers 113. The various parts of the assembly at this time are in the positions shown in FIGURE 14.

The Z-shaped lever 24 of the carrier unit is then pivoted in a clockwise direction, as viewed in FIGURE 14, about the pin 24a, and the upper leg of the lever bears against the turned up portion 114 of the support unit 104. During this pivotal movement, the assembled chain, carrier unit and clamp unit swing upwardly to the position shown in FIGURE 15, and the cross bar 75 is lifted and brought into engagement with the tire 116. As indicated heretofore, the coil spring 31 serves to resiliently connect the arm assembly 32 of the carrier unit with the chassis assembly 21. The chassis assembly is maintained in fixed relationship with the vehicle by the support member 104, while the cross bar 75 of the arm assembly is resiliently urged against the tire by the spring 31. With this arrangement, any inadvertent jarring or change in the distance between the vehicle body and the tire, such as might be occasioned by the weight of the driver on the suspension springs of the vehicle, the contour of the road, etc., is absorbed by the spring, and the arm assembly maintains the chain latching mechanisms 120 in preselected fixed positions relative to the axis of the tire.

The clockwise movement of the locking lever 24 about the pin 24a also carries the attached arms 26 and the tongue 27 in a generally downward direction with respect to the blades 43 and the clamp unit 80. The tongue 27 is thereby withdrawn from the slot 83 to release the clamp unit, and the arms 26 are separated from the upper ends of the blades 43 to permit the removal of the portion of the chain on the chassis assembly 21. The clamp unit is maintained in its position on the carrier unit, however, because of the frictional engagement between the rods 79 on the carrier unit and the clamp unit arms 94.

Figure 15:
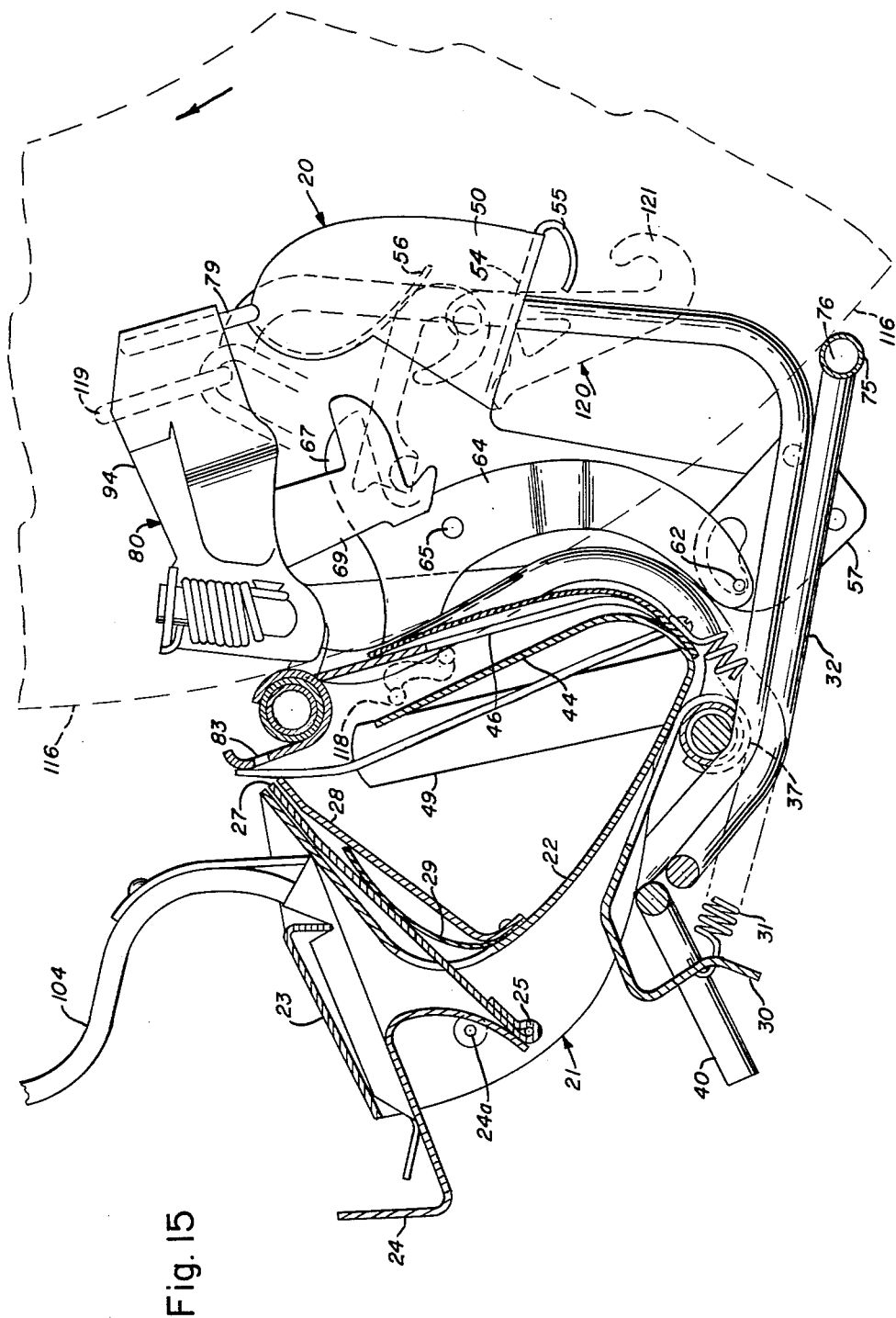
FIGURE 15 is a vertical sectional view in general similar to FIGURE 14 but showing the assembly in an operative position with respect to the tire immediately prior to the chain applying operation.

With the apparatus in its FIGURE 15 position, the pivoted catch 30 is manually urged in a clockwise direction about the axis of the spring 37 to lift the indentations 42 (FIGURE 6) out of registry with the handles 40 and permit the return of the arms 33 to their closed positions by the coil spring 37. As the arms 33 move toward each other, the upstanding fingers 79 permit movement of the arms 94 on the clamp unit 80 into frictional engagement with the side walls of the tire 116.

The vehicle is then driven slowly in a rearward direction, thereby imparting clockwise rotation to the tire 116, as indicated by arrows in several of the views. The chassis assembly 21 of the carrier unit is maintained in fixed relationship with the vehicle by the support member 104, and the cross bar 75 of the arm assembly 32 is resiliently urged against the tread of the rotating tire by the coil spring 31. As the tire rotates, the clamp unit 80 is released from the fingers 79 and rotates with the tire through substantially a full turn. During the first increment of rotation, the clamp unit moves upwardly from the position shown in FIGURE 15 and begins to withdraw successive cross chains from the chassis assembly. When the clamp unit has moved around with the tire and begins to approach the carrier unit, the cross chain between the shield 44 and the plate 46 is withdrawn and is located in position against the tread of the tire.

Figure 16:
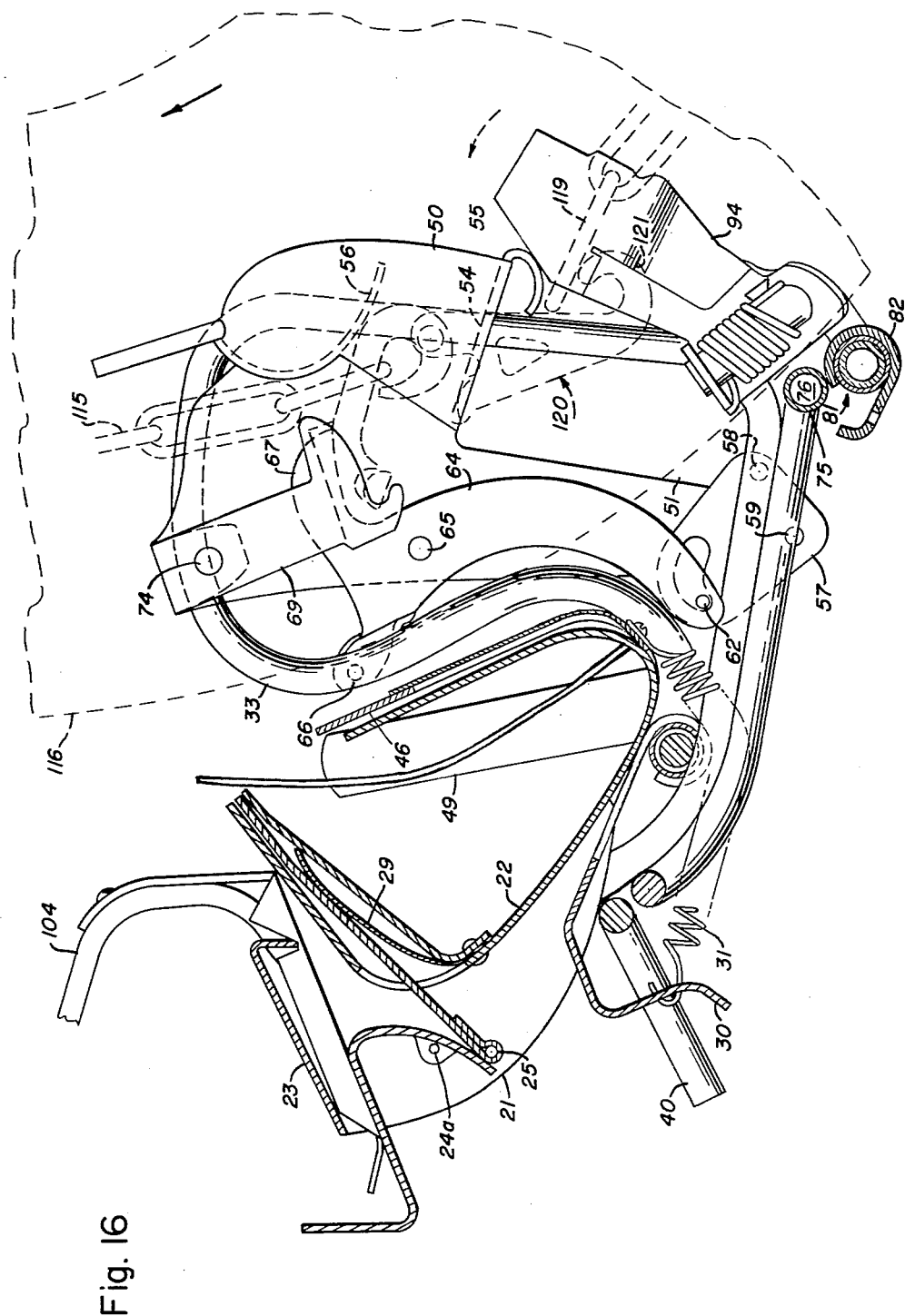
FIGURE 16 is a view in general similar to FIGURE 14 but showing the relative positions of the component parts of the apparatus after mounting the chain around the tire.
Figure 17:
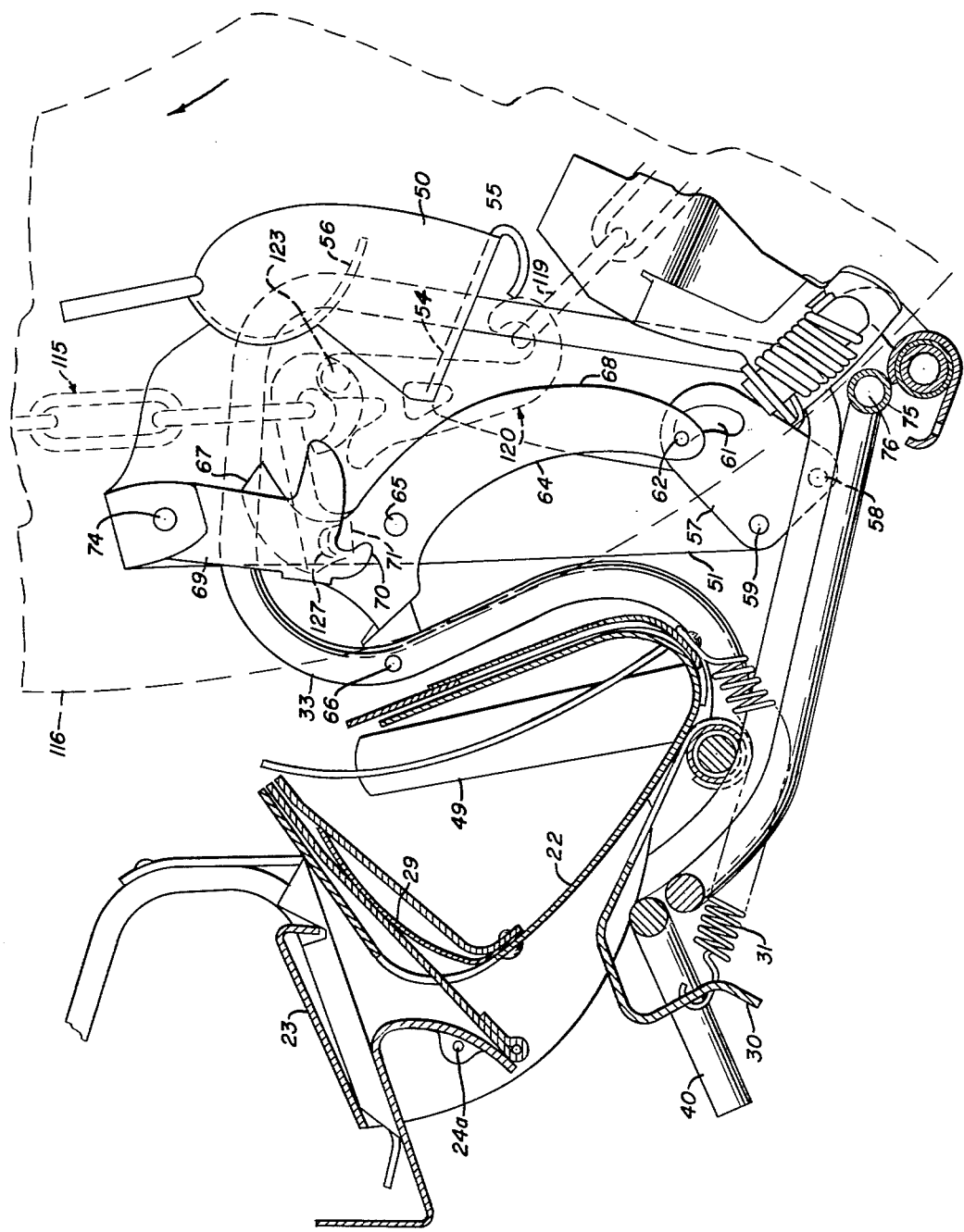
FIGURE 17 is a view in general similar to FIGURE 14 but showing the various components in position after the engagement of the latching mechanisms at one end of the chain with the end links at the other end of the chain.
Figure 18:
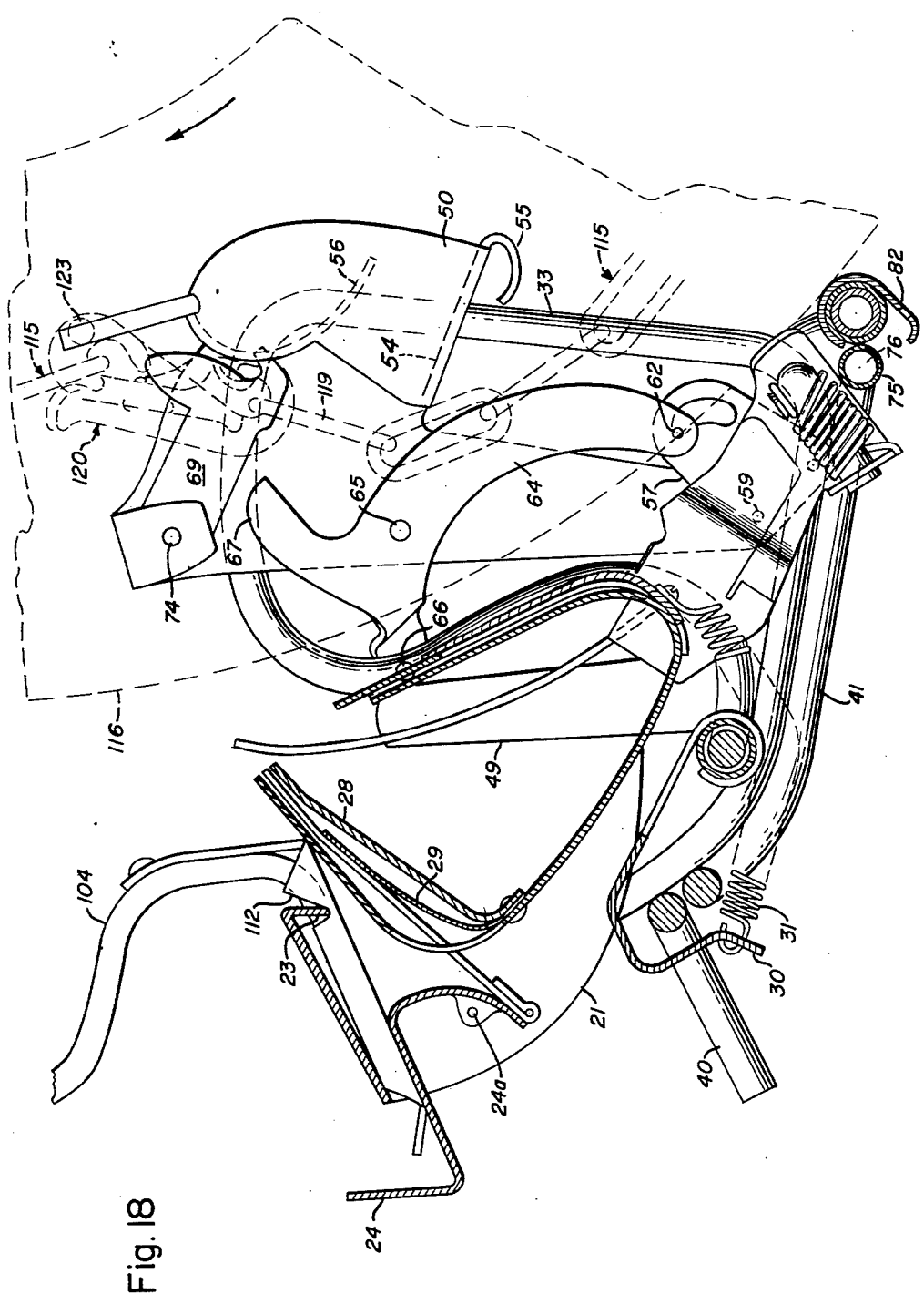
FIGURE 18 is a view in general similar to FIGURE 14 but showing the latching mechanisms in locked engagement with the end links and the carrier and clamp units in their relative positions upon the completion of the chain applying operation.

As the tire approaches the completion of a full turn, the parts successively assume the relative positions shown in FIGURES 16, 17 and 18. At the time the parts reach their FIGURE 16 positions, the major portion of the chain has been applied to the tire, and the member 82 of the clamp unit 104 has been brought into contact with the cross bar 75 of the arm assembly 32. This contact serves to momentarily retard the movement of the clamp unit relative to the carrier unit, and the clamp unit arms 94 pivot slightly in the direction indicated by the broken arrow in FIGURE 16 to bring the arms 94 into engagement with the bumpers 55 on the carrier unit. The movement of the clamp unit is thereby arrested with the end links 119 of the chain immediately above and in alignment with the hook members 121 on the chain latching mechanisms 120. It will be noted that this alignment is maintained irrespective of whether the chain is of a precise length or longer, because the clamp unit slips on the tire and is arranged to bear against the bumpers 55 and the cross bar 75.

In the course of the next increment of rotation of the tire, that is, from the FIGURE 16 position to the FIGURE 17 position, the pulling action of the side chains 115 acts through the latching mechanisms 120 within the receptacles 50 to produce limited movement of the receptacles relative to the arms 33 in a substantially vertical direction. The latching mechanisms move the receptacle side walls 51 upwardly to pivot the lever 64 in a counterclockwise direction, as viewed in FIGURE 17, about the pin 66. The extension 68 of the lever 66 is carried in a rearward direction from the position shown in FIGURE 16 to the position shown in FIGURE 17, causing pivotal movement of the lever 57 first counterclockwise and then clockwise about the pin 58 in the manner described heretofore. As the lever 57 completes its movement, the upward motion of the receptacle 50 is arrested.

The counterclockwise movement of the lever 64 about the pin 66 also carries the lever extension 67 away from its position in contact with the bent extension 71 of the latch 69. The continued pulling action of each side chain 115 thereupon pivots the latch 69 first in a clockwise direction and then in a counterclockwise direction about the pin 74 to move the latch from its FIGURE 16 position to that shown in FIGURE 18. The latching mechanism 120 thereupon slides along the curved receptacle wall 56 with the portion 127 of the keeper 122 in engagement with the finger 70 of the latch. As the pull exerted by the side chain causes the latching mechanism to slide out of the receptacle slot 53, the keeper 122 pivots in a counterclockwise direction about the pin 123 to carry the keeper into locking position with respect to the hook 121. Upon continued rotation of the tire, the thus locked latching mechanism is withdrawn from its receptacle 50 to effect the final release of the chain from the carrier unit.

During the time the receptacles 50 are carried upwardly from their FIGURE 16 position to that shown in FIGURE 17, the bumpers 55 thereon likewise move in an upward direction away from the arms 94 of the clamp unit 80. The pivotal movement of the clamp unit relative to the carrier unit cross bar 75 is thereupon resumed, and the arms 94 slide off the tire. Upon continued rearward movement of the vehicle from the position shown in FIGURE 18, the tongue member 82 engages the cross bar 75 to hold the clamp unit on the carrier unit, and the clamp unit slides along the road trailing the carrier unit until the vehicle stops.

To remove the carrier and clamp unit assembly from its position adjacent the tire, the carrier unit arms 33 are expanded by moving the actuating handles 40 toward each other in the manner described heretofore. The lever 24 is then urged in a counterclockwise direction to unlock the chassis assembly 21 from the support unit 104 and permit the manual movement of the cross piece 23 out of registry with the indentations 112. The carrier unit and the clamp unit are then returned to the storage compartment of the vehicle.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. Apparatus for applying a traction chain to a vehicle wheel tire, the traction chain including a pair of side chains, a plurality of cross chains, a latching mechanism at one end of each side chain and an end link at the other end of each side chain, said apparatus comprising, in combination, a tire clamp unit adapted to engage the side walls of the tire and rotate therewith, said tire clamp unit including means for releasably retaining each end link of the chain in a predetermined position relative to the rotating tire; a chain carrier unit including a chassis assembly for supporting the cross chains, an arm assembly for releasably retaining each latching mechanism of the chain in a preselected position relative to the axis of said tire and means interconnecting said chassis assembly and said arm assembly for permitting rocking motion of said chassis assembly with respect to said arm assembly; and bracket means permanently affixed to the vehicle and removably secured to said chassis assembly for holding the same in fixed relationship with said vehicle; said carrier and clamp units including means responsive to predetermined movement of the clamp unit relative to the carrier unit for retarding the movement of said clamp unit and for thereafter effecting coupling engagement of each latching mechanism with a corresponding end link.

2. Apparatus for applying a traction chain to a vehicle wheel tire, the traction chain including a pair of side chains, a plurality of cross chains, a latching mechanism at one end of each side chain and an end link at the other end of each side chain, said apparatus comprising, in combination, a tire clamp unit for releasably retaining each end link of the chain in a predetermined position relative to said tire; a chain carrier unit including a chassis assembly for supporting the cross chains, an arm assembly for releasably retaining each latching mechanism of the chain in a preselected position relative to the axis of said tire, and means for movably interconnecting said chassis assembly and said arm assembly, to permit rocking motion of said chassis assembly with respect to said arm assembly; and a support member connecting said chain carrier unit to the vehicle; said carrier and clamp units including means responsive to predetermined movement of the clamp unit relative to the carrier unit for effecting coupling engagement of each latching mechanism with a corresponding end link.

3. Apparatus for applying a traction chain to a vehicle wheel tire, the traction chain including a pair of side chains, a plurality of cross chains, a latching mechanism at one end of each side chain and an end link at the other end of each side chain, said apparatus comprising, in combination, a tire clamp unit adapted to engage the side walls of the tire and rotate therewith, said tire clamp unit including means for releasably retaining each end link of the chain in a predetermined position relative to the rotating tire; a chain carrier unit including a chassis assembly for supporting the cross chains, an arm assembly having a pair of spaced arms for releasably retaining each latching mechanism of the chain in a preselected position relative to the axis of said tire, and biasing means for resiliently interconnecting said chassis assembly and said arm assembly, to permit resiliently biased rocking motion of said chassis assembly with respect to said arm assembly; and a support member removably secured to said chassis assembly for holding the same in fixed relationship with the vehicle; said carrier and clamp units including means responsive to predetermined movement of the clamp unit relative to the carrier unit for retarding the movement of said clamp unit and for thereafter effecting coupling engagement of each latching mechanism with a corresponding end link.

4. Apparatus of the character set forth in claim 3, comprising means for permanently affixing said support member to the vehicle, said support member preventing movement of said chassis assembly relative to said vehicle and said biasing means resiliently urging said arm assembly away from said chassis assembly into engagement with said tire, to prevent movement of each latching mechanism carried thereby from its preselected position.

5. Apparatus for applying a traction chain to a vehicle wheel tire, the traction chain including a pair of side chains, a plurality of cross chains, a latching mechanism at one end of each side chain and an end link at the other end of each side chain, said apparatus comprising, in combination, a tire clamp unit adapted to engage the side walls of the tire and rotate therewith, said tire clamp unit including means for releasably retaining each end link of the chain in a predetermined position relative to the rotating tire; a chain carrier unit including a chassis assembly for supporting the cross chains, an arm assembly having a pair of spaced arms and a cross bar interconnecting said arms, and means resiliently interconnecting said chassis assembly and said arm assembly, to permit rocking motion of said chassis assembly with respect to said arm assembly, said arm assembly including means for releasably retaining each latching mechanism of the chain in a preselected position relative to the axis of said tire; and a support member interconnecting said chassis assembly and said vehicle, to hold said chassis assembly in fixed relationship with the vehicle and to maintain the cross bar of said arm assembly in resilient engagement with said tire; said carrier and clamp units including means responsive to predetermined movement of the clamp unit relative to the carrier unit for effecting coupling engagement of each latching mechanism with a corresponding end link.

6. Apparatus for applying a traction chain to a vehicle wheel tire, the traction chain including a pair of side chains, a plurality of cross chains, a latching mechanism at one end of each side chain and an end link at the other end of each side chain, said apparatus comprising, in combination, a tire clamp unit adapted to engage the side walls of the tire and rotate therewith, said tire clamp unit including first receptacle means for releasably retaining each end link of the chain in a predetermined position relative to the rotating tire; a chain carrier unit including a chassis assembly for supporting the cross chains, an arm assembly having a pair of spaced arms and a cross bar intermediate said arms, and means including an elongated coil spring resiliently interconnecting said chassis assembly and said arm assembly, to permit relative motion therebetween, said arm assembly including second receptacle means for releasably retaining each latching mechanism of the chain in a preselected position relative to the axis of said tire; and bracket means permanently affixed to the vehicle and removably affixed to said chassis assembly, for holding said chassis assembly in fixed relationship with the vehicle and for maintaining the cross bar of said arm assembly in resilient engagement with said tire; said carrier and clamp units including means responsive to predetermined movement of the clamp unit relative to the carrier unit for effecting coupling engagement of each latching mechanism with a corresponding end link.

7. Apparatus for applying a traction chain to a vehicle wheel tire, the traction chain including a pair of side chains, a plurality of cross chains, a latching mechanism at one end of each side chain and an end link at the other end of each side chain, said apparatus comprising, in combination, a tire clamp unit adapted to engage the side walls of the tire and rotate therewith, said tire clamp unit including first receptacle means for releasably retaining each end link of the chain in a predetermined position relative to the rotating tire; a chain carrier unit including a chassis assembly for supporting the cross chains, an arm assembly having a pair of spaced arms and second receptacle means carried by said arms for releasably retaining the latching mechanisms of the chain in preselected positions relative to the axis of said tire; and means for interconnecting said chassis assembly and said arm assembly, said arm assembly including means supporting said second receptacle means for movement relative to said spaced arms in a single predetermined direction in response to movement of said side chains in a corresponding direction; and a support member connecting said chain carrier unit to the vehicle; said carrier and clamp units including means responsive to predetermined movement of the clamp unit relative to the carrier unit for effecting coupling engagement of each latching mechanism with a corresponding end link.

8. Apparatus for applying a traction chain to a vehicle wheel tire, the traction chain including a pair of side chains, a plurality of cross chains, a latching mechanism at one end of each side chain and an end link at the other end of each side chain, said apparatus comprising, in combination, a tire clamp unit adapted to engage the side walls of the tire and rotate therewith, said tire clamp unit including a first pair of receptacles for releasably retaining the end links of the chain in predetermined positions relative to the rotating tire; a chain carrier unit including a chassis assembly for supporting the cross chains, an arm assembly connected to said chassis assembly, a second pair of receptacles for releasably retaining the latching mechanisms of the chain in preselected positions relative to the axis of said tire, and means for resiliently mounting each of the receptacles in said second pair on said arm assembly to permit movement of said second pair of receptacles with respect thereto in a single predetermined direction in response to movement of said side chains in a corresponding direction; and a support member removably affixed to said chassis assembly for holding the same in fixed relationship with the vehicle; said carrier and clamp units including means responsive to predetermined movement of the clamp unit relative to the carrier unit for effecting coupling engagement of each latching mechanism with a corresponding end link.

9. Apparatus for applying a traction chain to a vehicle wheel tire, the traction chain including a pair of side chains, a plurality of cross chains, a latching mechanism at one end of each side chain and an end link at the other end of each side chain, said apparatus comprising, in combination, a tire clamp unit adapted to engage the side walls of the tire and rotate therewith, said tire clamp unit including a first pair of receptacles for releasably retaining the end links of the chain in predetermined positions relative to the rotating tire; a chain carrier unit including a chassis assembly for supporting the cross chains, an arm assembly having a pair of spaced arms connected to said chassis assembly, a second pair of receptacles for releasably retaining the latching mechanisms of the chain in preselected positions relative to the axis of said tire, and linkage means for respectively connecting the receptacles in said second pair to said arms, said linkage means permitting limited movement of each of said second receptacles relative to its corresponding arm in a substantially vertical direction but preventing other movement of each said second receptacle with respect to its arm; and a support member interconnecting said vehicle and said chassis assembly for holding the chassis assembly in fixed relationship with the vehicle; said carrier and clamp units including means responsive to predetermined movement of the clamp unit relative to the carrier unit for retarding the movement of said clamp unit and for thereafter effecting coupling engagement of each latching mechanism with a corresponding end link.

10. Apparatus of the character set forth in claim 9, in which said linkage means includes a first lever and a second lever for each of the receptacles in said second pair, each of said levers being pivotally connected to the corresponding arm, and means for resiliently connecting said levers to the receptacle therefor, to bias the same in a preselected position relative to said corresponding arm.

11. Apparatus for applying a traction chain to a vehicle wheel tire, the traction chain including a pair of side chains, a plurality of cross chains, a latching mechanism at one end of each side chain and an end link at the other end of each side chain, said apparatus comprising, in combination, a tire clamp unit having a first pair of spaced arms adapted to engage the side walls of the tire and rotate therewith, said tire clamp unit including a first pair of receptacles respectively carried by said first arms for releasably retaining each end link of the chain in a predetermined position relative to the rotating tire; a chain carrier unit including a chassis assembly for supporting the cross chains, an arm assembly having a second pair of spaced arms, biasing means for resiliently interconnecting said chassis assembly and said arm assembly, to permit relative motion therebetween, a second pair of receptacles for releasably retaining each of the latching mechanisms of the chain in a preselected position relative to the axis of said tire, and linkage means for respectively connecting the receptacles in said second pair to said second arms, said linkage means permitting limited movement of each of said second pair of receptacles relative to its corresponding second arm in a single predetermined direction but preventing other movement of each said second receptacles relative to said second arms; and a support member connecting said arm assembly to the vehicle; said carrier and clamp units including means responsive to predetermined movement of the clamp unit relative to the carrier unit for effecting coupling engagement of each latching mechanism with a corresponding end link.

12. Apparatus for applying a traction chain to a vehicle wheel tire, the traction chain including a pair of side chains, a plurality of cross chains, a latching mechanism at one end of each side chain and an end link at the other end of each side chain, said apparatus comprising, in combination, a tire clamp unit adapted to engage the side walls of the tire and rotate therewith, said tire clamp unit including a first pair of spaced arms resiliently movable toward and away from each other and a first pair of retainer means respectively carried by said first arms for releasably retaining each end link of the chain in a predetermined position relative to the rotating tire; a chain carrier unit including a chassis assembly for supporting the cross chains, an arm assembly having a second pair of spaced arms and a cross bar, biasing means for resiliently interconnecting said chassis assembly and said arm assembly, to permit relative motion therebetween and to resiliently bias said cross bar into engagement with said tire, a second pair of retainer means for releasably retaining each of the latching mechanisms of the chain in a preselected position relative to the axis of said tire, and linkage means for respectively connecting said second retainer means to said second arms, said linkage means permitting movement of each of said second retainer means relative to its corresponding second arm in a substantially vertical direction between a lower and an upper position but preventing other movement of said second retainer means relative to said second arms; and a support member removably affixed to said chassis assembly for holding the same in fixed relationship with the vehicle; said carrier and clamp units including means respensive to predetermined movement of the clamp unit relative to the carrier unit for momentarily retarding the movement of said clamp unit and for effecting coupling engagement of each latching mechanism with a coresponding end link.

13. Apparatus for applying a traction chain to a vehicle wheel tire, the traction chain including a pair of side chains, a plurality of cross chains, a latching mechanism at one end of each side chain and an end link at the other end of each side chain, said apparatus comprising, in combination, a tire clamp unit adapted to engage the side walls of the tire and rotate therewith, said tire clamp unit including a first pair of spaced arms resiliently movable toward and away from each other and a first pair of retainer means respectively carried by said first arms for releasably retaining each end link of the chain in a predetermined position relative to the rotating tire; a chain carrier unit including a chassis assembly for supporting the cross chains, an arm assembly having a second pair of spaced arms and a cross bar, biasing means for resiliently interconnecting said chassis assembly and said arm assembly, to permit relative motion therebetween to resiliently bias said cross bar into engagement with said tire, a second pair of retainer means for releasably retaining each of the latching mechanisms of the chain in a preselected positon relative to the axis of said tire, and linkage means for respectively connecting said second retainer means to said second arms, said linkage means permitting movement of each of said second retainer means relative to its corresponding second arm in a substantially vertical direction between a lower and an upper position but preventing other movement of said second retainer means relative to said second arms; and a support member removably affixed to said chassis assembly for holding the same in fixed relationship with the vehicle; said carrier and clamp units including means responsive to predetermined movement of the clamp unit relative to the carrier unit for momentarily retarding the movement of said clamp unit and for effecting coupling engagement of each latching mechanism with a corresponding end link, said last-mentioned means including means carried by each of said second retainer means in position to engage the arms of said clamp unit when said second retainer means are in their lower positions, to momentarily retard the movement of said clamp unit, said clamp unit resuming its movement relative to said carrier unit upon the vertical movement of said second retainer means to their upper positions.

14. Apparatus of the character set forth in claim 13, in which said linkage means includes a plurality of levers for maintaining each of said second retainer means in one of its upper and lower positions, and spring means for connecting said levers to said second retainer means.

15. Apparatus for applying a traction chain to a vehicle wheel tire, the traction chain including a pair of side chains, a plurality of cross chains, a latching mechanism at one end of each side chain and an end link at the other end of each side chain, said apparatus comprising, in combination, a tire clamp unit adapted to engage the side walls of the tire and rotate therewith, said tire clamp unit including a first pair of spaced arms resiliently movable toward and away from each other and a first pair of retainer means respectively carried by said first arms for releasably retaining the end links of the chain in predetermined positions relative to the rotating tire; a chain carrier unit including a chassis assembly for supporting the cross chains, an arm assembly having a second pair of spaced arms resiliently movable toward and away from each other and a cross bar, means including a coil spring for resiliently interconnecting said chassis assembly and said arm assembly, to permit relative motion therebetween and to resiliently bias said cross bar into engagement with said tire, a second pair of retainer means for releasably retaining the latching mechanisms of the chain in preselected positions relative to the axis of said tire, and linkage means for respectively connecting said second retainer means to said second arms, said linkage means permitting movement of each of said second retainer means relative to its corresponding second arm in a substantially vertical direction between a lower and an upper position but preventing other movement of said second retainer means relative to said second arms; and a support member permanently affixed to the vehicle and removably connected to said chassis assembly for holding the same in fixed relationship with the vehicle; said carrier and clamp units including means responsive to predetermined movement of the clamp unit relative to the carrier unit for momentarily retarding the movement of said clamp unit and for effecting coupling engagement of each latching mechanism with a corresponding end link.

16. Apparatus of the character set forth in claim 15, which includes latching means operable under the control of said coil spring for holding said second arms in predetermined, spaced-apart relationship with each other.

17. Apparatus for applying a traction chain to a vehicle wheel tire, the traction chain including a pair of side chains, a plurality of cross chains, a latching mechanism at one end of each side chain and an end link at the other end of each side chain, said apparatus comprising, in combination, a tire clamp unit adapted to engage the side walls of the tire and rotate therewith, said tire clamp unit including first receptacle means for releasably retaining each end link of the chain in a predetermined position relative to the rotating tire; a chain carrier unit including a chassis assembly for supporting the cross chains, an arm assembly having a pair of spaced arms and a cross bar intermediate said arms, said arms being movable toward and away from each other between a closed position and an open position, resilient means connected to said arms for normally biasing the same toward said closed position, manually operable means for moving said arms to said open position against the action of the resilient means, means including an elongated coil spring resiliently interconnecting said chassis assembly and said arm assembly, to permit relative motion therebetween, and means operable under the control of said elongated coil spring for maintaining said arms in said open position, said arm assembly including second receptacle means for releasably retaining each latching mechanism of the chain in a preselected position relative to the axis of said tire; and a support member permanently affixed to the vehicle and removably affixed to said chassis assembly, for holding said chassis assembly in fixed relationship with the vehicle and for maintaining the cross bar of said arm assembly in resilient engagement with said tire; said carrier and clamp units including means responsive to predetermined movement of the clamp unit relative to the carrier unit for effecting coupling engagement of each latching mechanism with a corresponding end link.

References Cited by the Examiner

UNITED STATES PATENTS

| | | | |
|---|---|---|---|
| 1,351,206 | 8/1920 | Farnsworth | 152—215 |
| 1,642,921 | 9/1927 | Cronenweth | 152—215 |
| 2,159,626 | 5/1939 | Boycott | 81—15.8 |
| 2,768,545 | 10/1956 | Bertelsen | 81—15.8 |
| 2,990,737 | 7/1961 | Smith-Miller | 81—15.8 |
| 3,136,188 | 6/1964 | Smith-Miller | 81—15.8 |

WILLIAM FELDMAN, *Primary Examiner.*

MILTON S. MEHR, *Examiner.*

M. BALAS, *Assistant Examiner.*